United States Patent
Tanaka

(10) Patent No.: US 8,020,040 B2
(45) Date of Patent: Sep. 13, 2011

(54) INFORMATION PROCESSING APPARATUS FOR HANDLING ERRORS

(75) Inventor: Noriyoshi Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 109 days.

(21) Appl. No.: 12/479,091

(22) Filed: Jun. 5, 2009

(65) Prior Publication Data

US 2010/0031083 A1 Feb. 4, 2010

(30) Foreign Application Priority Data

Jul. 29, 2008 (JP) .................................. 2008-195180

(51) Int. Cl.
G06F 11/00 (2006.01)
(52) U.S. Cl. .......................................... 714/10; 714/48
(58) Field of Classification Search ................ 714/4, 10, 714/11, 13, 26, 48
See application file for complete search history.

(56) References Cited

U.S. PATENT DOCUMENTS

| | | | |
|---|---|---|---|
| 3,814,919 A * | 6/1974 | Repton et al. ................... 714/25 |
| 5,249,187 A * | 9/1993 | Bruckert et al. ................. 714/11 |
| 5,682,518 A | 10/1997 | Inoue | |
| 6,199,179 B1 * | 3/2001 | Kauffman et al. ............... 714/26 |
| 6,907,558 B2 * | 6/2005 | Suh ................................. 714/752 |
| 7,302,615 B2 * | 11/2007 | Sakai ............................... 714/43 |
| 2002/0032885 A1 * | 3/2002 | Dai .................................. 714/57 |
| 2002/0095668 A1 * | 7/2002 | Koseki et al. .................. 717/157 |
| 2004/0019835 A1 * | 1/2004 | Marisetty et al. ............... 714/48 |
| 2007/0088988 A1 | 4/2007 | Gupta et al. | |
| 2008/0133975 A1 * | 6/2008 | Pfeiffer et al. .................. 714/38 |

FOREIGN PATENT DOCUMENTS

| | | |
|---|---|---|
| JP | 5-204770 | 8/1993 |
| JP | 7-271403 A | 10/1995 |
| JP | 2007-109238 A | 4/2007 |

OTHER PUBLICATIONS

Japanese Notice of Ground(s) of Rejection, English-language translation, mailed May 11, 2010 for corresponding Japanese Application No. 2008-195180.

* cited by examiner

*Primary Examiner* — Robert Beausoliel, Jr.
*Assistant Examiner* — Elmira Mehrmanesh
(74) *Attorney, Agent, or Firm* — Fujitsu Patent Center

(57) ABSTRACT

In the event of occurrence of an error in a memory in an information processor, a first processor that is one of a number of processors executes an error handler program stored in a first memory that is one of a number of memories. If the first processor fails in correctly operating the error handler program, a second processor different from the first processor executes an error handler program stored in a second memory different from the first memory.

4 Claims, 6 Drawing Sheets

FIG. 5

| RESULT OF RETRY | JUDGMENT |
|---|---|
| HANG UP | DEVICE MALFUNCTION |
| NOT HANG UP | CPU MALFUNCTION |

INFORMATION PROCESSING APPARATUS FOR HANDLING ERRORS

CROSS-REFERENCE TO RELATED APPLICATIONS

This application is based upon and claims the benefit of priority of the prior Japanese Patent Application No. 2008-195180, filed on Jul. 29, 2008, the entire contents of which are incorporated herein by reference.

FIELD

The embodiment discussed herein is a technique to handle a possible error occurred in an information terminal including a number of processors and a number of memories.

BACKGROUND

FIG. 6 is a block diagram schematically illustrating the hardware configuration of a conventional information processor.

An information processor 300 depicted in FIG. 6 includes one or more (two in the example of FIG. 6) CPUs 301a and 301b, one or more (two in the example of FIG. 6) memories 302a and 302b, chipsets 303 and 304, a PCI device 305, and an I/O device 306.

The CPUs 301a and 301b realize various functions and controls through the execution of programs.

The memories 302a and 302b temporarily store various pieces of data and programs for execution of the programs in the CPUs 301a and 301b.

The chipset 303 (North Bridge) controls connection of the CPUs 301a and 301b to the memories 16a and 16b. The chipset 303 includes a memory controller 307, through which the memories 302a and 302b are controlled.

In the example of FIG. 6, to the chipset 303, the PCI device 305 is connected, so that the chipset 303 controls the connection of the PCI device 305 and the chipset 303.

The chipset 304 (South Bridge) serves as an integration of various I/O (Input/Output) controllers and is communicably connected to the chipset 303. In the example of FIG. 6, to the chipset 304, the I/O device 306 is connected.

The I/O device 306 is a peripheral device used in an information processor and is exemplified by a CompactFlash (trademark) or a BIOS flash.

The example of FIG. 6 illustrates a state of an error handler 308 being expanded (stored) in the memory 302a. The error hander 308 is a program (a code, a handler) to handle a possible abnormality (error) which occurs in either the memory 302a or 302b during the operation of the information processor 300, and is executed by the CPU 301a.

An error (a memory error) may occur in the memory 302a or 302b in the conventional information processor 300.

For example, in the disclosure of the patent reference 1 below, if an uncorrectable error occurs, an ECC (Error Correction Code) error handler allocates a new page; copies data of a page on which the error has occurred to the new page; and makes the page with the error disable. Thereby the patent reference 1 prevents the system from hanging up even if an uncorrectable error occurs.

[Patent Reference 1] Japanese Patent Application Laid-Open (KOKAI) No. HEI 5-204770

However, in the above conventional information processor 300, the error handler 308 cannot sufficiently handle an error in some case.

For example, if an uncorrectable error occurs in the memory 302a, there is a high possibility that an error may occur at another points on the same memory (i.e., the memory 302a).

Accordingly, while the error handler 308 is being executed to handle the memory uncorrectable error, if another memory uncorrectable error occurs, the execution code of the error handler 308 expanded on the same memory 302a may come to be abnormal, causing a hang. In the event that the error handler hangs up, it is impossible to identify the point of occurrence of the error.

Further, if an error occurs during the system operation in the information processor 300, the CPU 301a (error handler 308) extracts information from each of the devices installed in the information processor 300 so that the point of occurrence of the error is identified on the basis of the extracted information.

However, when the CPU 301a accesses a device to extract information from the device and the device has an error, the system may hang up (freezes). A hang occurred while the CPU 301a is extracting information from a device, the CPU 301a cannot extract information from the remaining device, so that a point of occurrence of the error cannot be identified.

Further, if a system hangs up, the conventional information processor cannot judge whether the hang of the system has been caused by the device being accessed by the CPU 301a or by the CPU 301a itself. Consequently, the point of occurrence or the error cannot also be identified.

SUMMARY

As one of the requirements of the embodiment, there is provided an information processor including: a number of processors comprising a first processor and a second processor; and a number of memories comprising a first memory and a second memory; at least two error handler program retaining sections which are provided at least to the first memory and the second memory and which retain an error handler program, if an error occurs in one of the memories, the first processor executing the error handler program stored in the first memory, if the first processor has failed to normally complete the error handler program, the second processor executing the error handler program stored in the second memory.

Another requirement of the embodiment, there is provided an information processor comprising: a plurality of processors including a first processor and a second processor; a memory; and a number of devices, if the error occurs while a process is being performed on one of the devices, the first processor sequentially accessing one or more non-extracted devices from which information has not been extracted among the devices in a first scanning order to extract information from each of the non-extracted devices, and the second processor sequentially accessing the non-extracted devices in a second scanning order reverse to the first scanning order to extract information from the non-extracted devices.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a table depicting a manner of specifying the cause of a hang occurred during extracting device information in the first modification.

DESCRIPTION OF EMBODIMENT

Hereinafter, description will now be made in relation to a first embodiment of the present invention with reference to the accompanying drawings.

(A) First Embodiment

Figure 1:
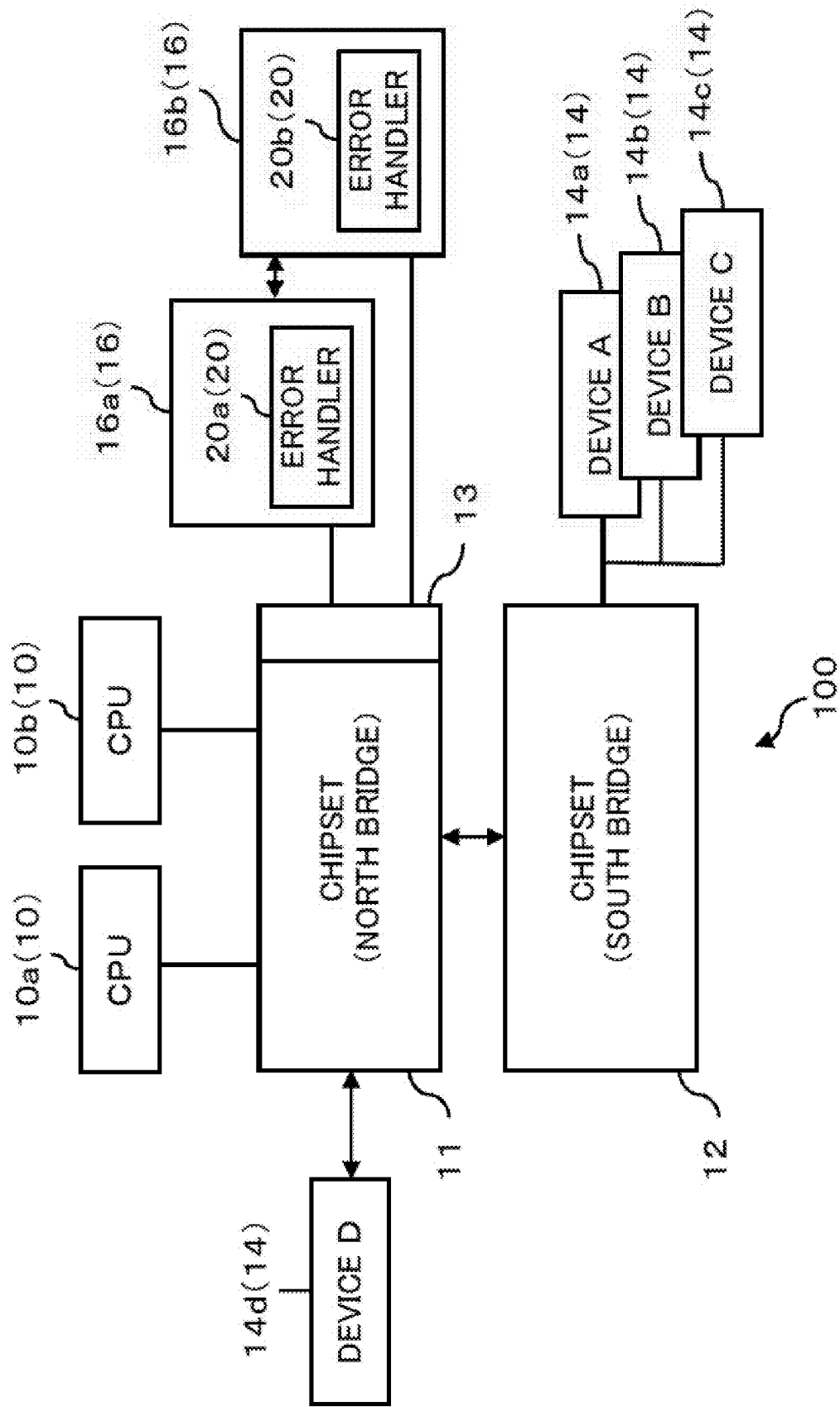
FIG. 1 is a diagram schematically illustrating the hardware configuration of an information processor according to a first embodiment of the present invention.

FIG. 1 is a block diagram schematically illustrating the hardware configuration of an information processor according to the first embodiment of the present invention.

An information processor 100 of the first embodiment includes, as illustrated in FIG. 1, one or more (two in the example of FIG. 1) CPUs 10a and 10b, one or more (two in the example of FIG. 1) memories 16a and 16b, chipsets 11 and 12, and devices 14a, 14b, 14c, and 14d.

The chipset 11 (North Bridge) controls connection of the CPUs 10a and 10b to the memories 16a and 16b. The chipset 11 includes a memory controller 13, through which data and programs are written and read between the CPUs 10a and 10b and the memories 16a and 16b.

In the example of FIG. 1, to the chipset 11, the device 14d is connected so that the chipset 11 controls the device 14d to transmit data to or receive data from the CPUs 10a and 10b and the memories 16a and 16b.

The chipset 12 (South Bridge) serves as an integration of various I/O (Input/Output) controllers and is communicable with the chipset 11. In the example depicted in FIG. 1, to the chipset 12, the devices 14a, 14b and 14c are connected.

The devices 14a, 14b, 14c, and 14d are peripheral devices used in the information processor 100. The devices 14a, 14b, and 14c are each exemplified by a CompactFlash (trademark) or a BIOS flash. The device 14d is exemplified by a PCI (Peripheral Component Interconnect) device.

Hereinafter, a particular device is represented by the reference number one of 14a, 14b, 14c, and 14d, but an arbitrary device is represented by the reference number 14.

Further, hereinafter, the devices 14a, 14b, 14c, and 14d are sometimes called devices A, B, C, and D, respectively.

The CPUs (Central Processing Units) 10a and 10b are processors that realize various functions and controls by executing programs. The memories 16a and 16b are RAMs (Random Access Memories) that temporarily store various pieces of data and programs (codes) for execution of the programs in the CPUs 10a and 10b.

In the information processor 100 of the first embodiment, the CPU 10a executes programs expanded (stored) in the memory 16a and the CPU 10b executes programs expanded in the memory 16b.

Hereinafter, particular one of the CPU is represented by the reference number 10a or 10b as required, but an arbitrary CPU is represented by the reference number 10. Similarly, particular one of the memories is represented by the reference number 16a or 16b, but an arbitrary memory is represented by reference number 16.

Hereinafter, the CPU 10a and the CPU 10b are sometimes called a CPU A and a CPU B, respectively, and similarly the memory 16A and the memory 16B are sometimes called a memory A and a memory B, respectively.

In the information processor 100, the CPU 10a and the CPU 10b are configured to be physically separated from each other, and similarly the memory 16a and the memory 16b are configured to be physically separated from each other.

Upon starting up the information processor 100, the BIOS (Basic Input Output System) loads various programs and data which are read from a storage, such as a ROM (Read Only Memory; Not illustrated) and/or a HDD (Hard Disk Drive) into the memories 16a and 16b.

As depicted in FIG. 1, an error handler 20a and an error handler 20b are stored in the memory 16a and the memory 16b in the information processor 100, respectively.

The error handlers 20a and 20b are each programs (codes, handlers, error handler programs) to handle possible hangs (errors) occurring during the operation of the information processor 100. The error handlers 20a and 20b are executed if an error (a hang) occurs in the memory 16a or 16b during the operation of the information processor 100. For example, the error handlers 20a and 20b are executed when an uncorrectable error is detected in the memory 16a or 16b.

Detection of an error (an uncorrectable error) occurred in the memories 16a and 16b are realized by one of the various methods already known to the public, so the description thereof is omitted here.

If an uncorrectable error in the memory 16a or 16b is detected, a memory controller 13, for example, notifies, by an interruption signal, of the detection of the uncorrectable error of the CPUs 10a and 10b.

Upon receipt of the notification of the error detection in the memory 16a or 16b, the CPUs 10a and 10b execute the error handlers 20a and 20b to access and extract predetermined information from each of the devices 14 included in the information processor 100 so that a device (suspicious point) that is the cause of the detected error is identified.

Specifically, the error handlers 20a and 20b instruct the CPU 10a and 10b to extract information from each device 14 included in the information processor 100, carry out error analysis on the basis of the extracted information, and to identify a suspicious point.

Here, information extraction from a device 14, error analysis and identification of a suspicious point can be each one of the various methods already known to the public, so the description thereof is omitted here.

In addition to the above information extraction from a device 14, error analysis and identification of a suspicious point, the error handler 20a (20b) realizes a confirmation function that confirms whether or not the CPU 10a (10b) has succeeded in correctly operating the error handler 20a (20b).

The confirmation function is accomplished by, for example, confirmation as to whether of not a predetermined flag (a status flag) has been set which indicates that the CPU 10a (10b) has succeeded in correctly operating the error handler 20a (20b) within a predetermined time since the CPU 10a (10b) has started the error handler 20a (20b).

The error handlers 20a and 20b are read from a ROM or a HDD (both not depicted) and are stored in the memories 16a and 16b respectively through the execution of the BIOS by the CPU 10a or 10b when, for example, starting the information processor 100.

In other words, execution of the BIOS by the CPU 10a or 10b in the information processor 100 makes the CPU 10 function as an error handler program storing section which stores error handlers 20a and 20b respectively into the memories 16a and 16b.

Hereinafter, the error handler 20a and the error handler 20b may sometimes be called the error handler A and the error handler B, respectively.

In the information processor 100 of the first embodiment, the CPU 10a executes the error hander 20a stored in the memory 16a and the CPU 10b executes the error hander 20b stored in the memory 16b.

Since the memories 16a and 16b are configured to be physically separated from each other (independent from each other), occurrence of an error (an uncorrectable error) in one of the memories 16a and 16b does not affect the other memory 16.

In the information processor 100 having the above configuration, if an uncorrectable error occurs in the memory 16a or 16b, the occurrence of the uncorrectable error is notified to the CPUs 10a and 10b through, for example, an interruption process or the like so that the CPUs 10a and 10b execute the error handlers 20a and 20b, respectively.

Figure 2:
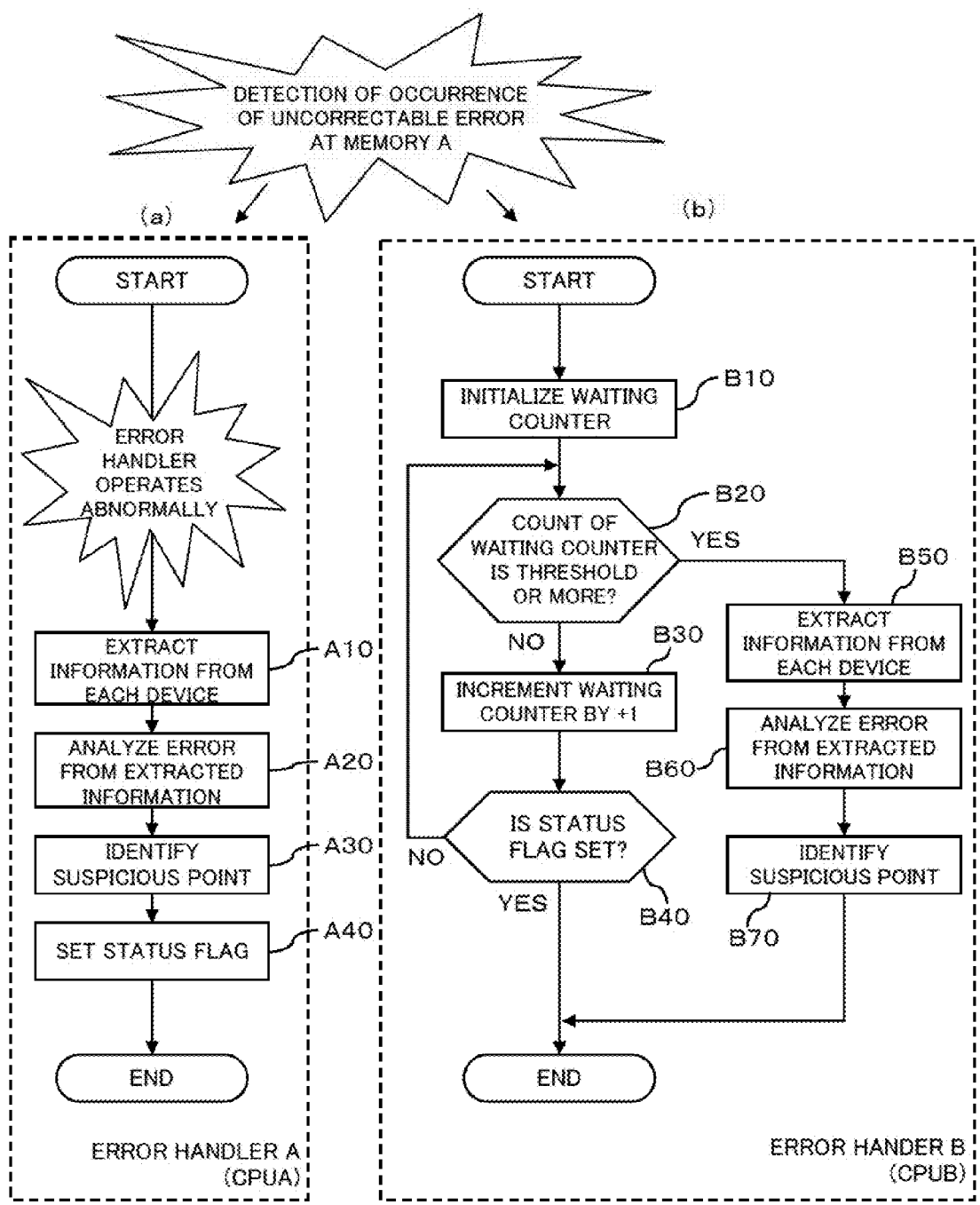
FIGS. 2a and 2b are flow diagrams each denoting a succession of procedural steps performed when an error occurs at a memory in the information terminal of the first embodiment.

A description will now be made in relation to a succession of procedural steps performed when an error occurs in the memory 16a of the information processor 100 with reference to FIGS. 2(a) and 2(b). FIG. 2(a) depicts a procedure performed by the error handler A (CPU A) and the FIG. 2(b) depicts a procedure performed by the error handler B (CPU B).

For example, upon detection of occurrence of an uncorrectable error at the memory 16a, the error detection is notified to the CPU 10a (CPU A) and the CPU 10b (CPU B) through an interruption signal or the like.

The CPU 10a executes the error handler 20a (error hander A) stored in the memory 16a as depicted in FIG. 2(a) so that information of each device 14 included in the information processor 100 is extracted (obtained) (step A10).

On the basis of the information extracted, the CPU 10a carries out an error analysis (step A20) and consequently identifies a suspicious point (step A30).

After the identification of a suspicious point, the CPU 10a sets a flag (a status flag) on a predetermined region of a NVRAM (Non Volatile RAM, not illustrated) mounted on the same mother board as the CPU 10a (step A40), for example, and terminates the procedure.

The status flag may be set on a predetermined region of the memory 16a or 16b, or another non-illustrated storage, but is preferably set in the NVRAN on the mother board, considering retention of the status flag even through a system hang and the access speed to the status flag.

If a memory uncorrectable error causes abnormality in CPU 10a during the execution by the error handler A, the above procedure of the error A cannot be completed so that the steps A10 to A40 are not performed. Accordingly, the status flag (see step A40) is not set in this case.

In the meanwhile, the CPU 10b executes the error handler 20b (error handler B) stored in the memory 16b and thereby initializes a waiting counter value (t) (i.e., t=0) (step B10), as depicted in FIG. 2b.

The CPU 10b confirms whether or not the waiting counter value (t) is a predetermined threshold value (a constant value) or more (step B20). If the result of the confirmation is negative (No route in step B20), the CPU 10b increases the waiting counter value (t) in increment of one (t=t+1) (step B30).

The CPU 10b confirms whether or not the status flag that represents the completion of the procedure of the error handler 20a has been set (step B40). If the result of the confirmation in step B40 is negative (No route in step B40), the CPU 10b returns the procedure to the step B20. Conversely, if the result of the confirmation in step B40 is positive (Yes route in step B40), the CPU 10b terminates the procedure.

On the other hand, if the result of the confirmation in step B20 is positive (Yes route in step B20), the CPU 10b extracts information from each of the devices 14 included in the information processor 100 (step B50).

The CPU 10b then carries out error analysis based on the extracted information (step B60), thereby identifies a suspicious point (step B70), and finally terminates the procedure.

Namely, in the information processor 100 of the first embodiment, if the CPU 10a cannot correctly execute the error handler 20a stored in the memory 16a, the CPU 10b executes the error handler 20b stored in the memory 16b to identify a suspicious point.

As described above, even if due to the occurrence of an uncorrectable error in the memory 16a, the CPU 10a hangs up during the execution of the error handler 20a which operates on the memory 16a, the CPU 10b executes the error handler 20b stored in the memory 16b in the information processor 100 of the first embodiment, so that use of the memory 16a, in which the error occurs, is avoided and the error does not affect the information processor 100 any longer.

Thereby, the CPU 10b can handle the error, specifically identifying of the point and the cause of the error occurred. Accordingly, the error (uncorrectable error) can be surely overcome, improving reliability of the information processor 100.

In other words, the redundancy of the error handler 20 makes the information processor 100 possible to prevent the system from hanging up and from not identifying the position of the error.

(B) First Modification

Next, description will now be made in relation to a manner of extracting information from each device 14 during execution of the error handler according to the first modification to the first embodiment of the present invention.

In the information processor 100 of the first modification, the CPU 10a executes the error handler 20a stored in the memory 16a and thereby extracts information from each of the devices 14. In parallel with the procedure of the CPU 10a, the CPU 10b executes the error handler 20b stored in the memory 16b and thereby extracts information from each device 14.

Specifically, in order to extract information from each of the devices 14 included in the information processor 100, the CPU 10a executes the error handler 20a stored in the memory 16a and thereby accesses the devices 14 in predetermined scanning order and extracts information. In parallel with the operation of the CPU 10a, the CPU 10b executes the error handler 20b stored in the memory 16b and thereby accesses the devices 14 in the order reverse to the above scanning order to extract information from the devices 14.

Figure 3:
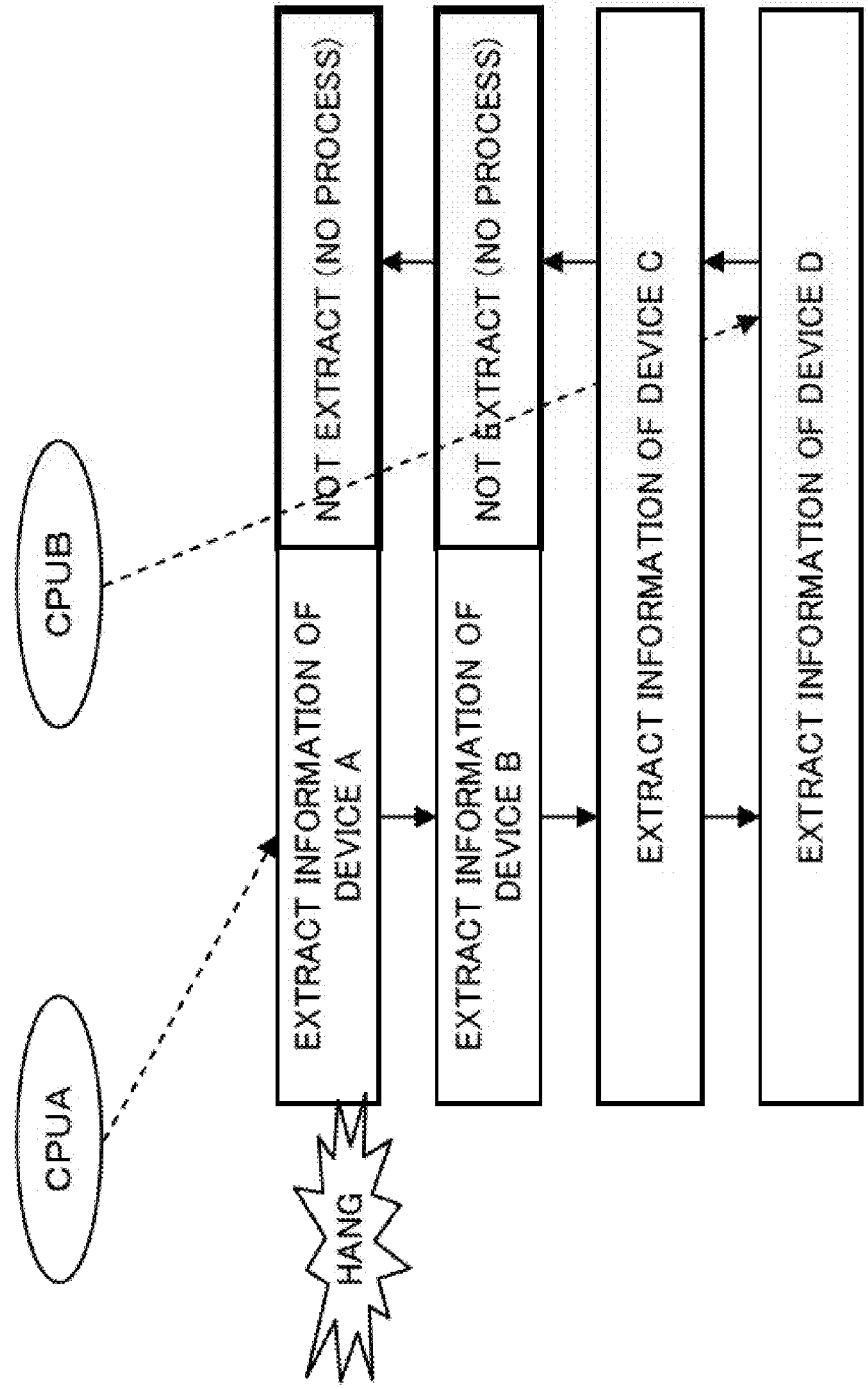
FIG. 3 is a diagram illustrating a manner to extract device information in an information processor according to a first modification to the first embodiment.

FIG. 3 is a diagram illustrating a method for extracting device information in the information processor 100 according to the first modification.

As depicted in the example of FIG. 3, the predetermined scanning order of a number of devices (four of device A to device D in the example of FIG. 3) begins with the device A, which is sequentially followed by the device B, the device C, and the device D.

The CPU 10a (a first processor) executes the error handler 20a stored in the memory 16a and sequentially accesses the device A, the device B, the device C and the device D according to the predetermined scanning order and extracts information from these devices.

At the start of information extraction from the device 14 being accessing, the error handler 20a causes the CPU 10a to set a flag (extraction flag, information extraction flag) on, for example, the NVRAM.

In detail, the error handler 20a sets in association with each device 14 an extraction flag on a predetermined position of the NVRAM mounted on the same mother board as the CPU 10a.

The extraction flag may be set on a predetermined region of the memory 16a or 16b, or another non-illustrated storage, but is preferably set in the NVRAM on the mother board, considering retention of the extraction flag even when the system hangs up and access speed to the extraction flag.

Namely, in the first modification, the CPU 10a sets an extraction flag for a device 14 from which information is being extracted or has already been extracted. The CPUs 10a and 10b can easily grasp the progress in extraction of information from a device 14 simply with reference to the extraction flag for the same device 14.

When the CPU 10a is to access a device 14 and extract information from the device 14 through the execution of the error handler 20a, the CPU 10a confirms whether or not the extraction flag has been set for the device 14, and makes an access only to a device (non extracted device) for which the extraction flag has not been yet set and extracts information from the non-extracted device.

In the first modification, in parallel with the above information extraction from the device 14 by the CPU 10a, the CPU 10b (the second processor) executes the error handler 20b stored in the memory 16b and thereby extracts information through the access to the devices 14 in the order reverse to the predetermined order scanning order, that is, in order of the device D, the device C, the device B, and the device A.

At the start of information extraction from the device 14 being accessing, the error handler 20b also causes the CPU 10b to set a flag (extraction flag, information extraction flag) on, for example, the NVRAM mounted on the same as the CPU 10a.

In detail, the error handler 20b sets in association with each device 1 an extraction flag on a predetermined position of the NVRAM on the same mother board as the CPU 10b 4.

The extraction flag may be set on a predetermined region of the memory 16a or 16b, or another non-illustrated storage, but is preferably set in the NVRAM on the mother board, considering retention of the extraction flag even when the system hang up and access speed to the extraction flag.

When the CPU 10b is to access a device 14 and extract information from the device 14 through the execution of the error handler 20b, the CPU 10b confirms whether or not the extraction flag has been set for the device 14, and makes an access only to a device (non-extracted device) for which the extraction flag has yet not been set and extracts information from the non-extracted device.

With this configuration, when the CPU 10b is to access each device 14 and extracts information from the device 14 through the execution of the error handler 20b, the error handler 20b does not extract information from a device 14 from which information has already been extracted through the execution of the error handler 20a by the CPU 10a.

From the above, the information processor 100 of the first modification can escape from redundancy in extracting information from the same device 14, so that information can be efficiently extracted from the devices 14.

If either one of the CPUs 10 (e.g., the CPU 10a, the first processor) abnormally halts (hangs up) while extracting information from a device 14 (in the example of FIG. 3, information extraction from the device B), the hanged-up CPU 10a (the processor abnormally halts) cannot extract information from the devices (the devices C and D) descent in the scanning order.

In the meanwhile, the CPU 10b (the second processor) makes accesses to and extracts information from non-extracted devices in the reverse order to the scanning order of the CPU 10a. Specifically, the CPU 10b extracts information from, in sequence, the device D and the device C, and then confirms the presence of the extraction flag set for the device B. Since the extraction flag for the device B has already been set by the CPU 10a, the CPU 10b does not extract information from the device B in question and the descent device (i.e., the device A).

Description will now be made in relation to a manner of extracting information from each device in the information processor 100 of the first modification with the above configuration with reference to flow diagram (steps C10 to C120 and D10 to D120) in FIGS. 4(a) and 4(b).

First of all, the CPU 10a executes the error handler 20a (error handler A) stored in the memory 16a and thereby starts extraction of information from each device 14 included in the information processor 100.

Figure 4A:
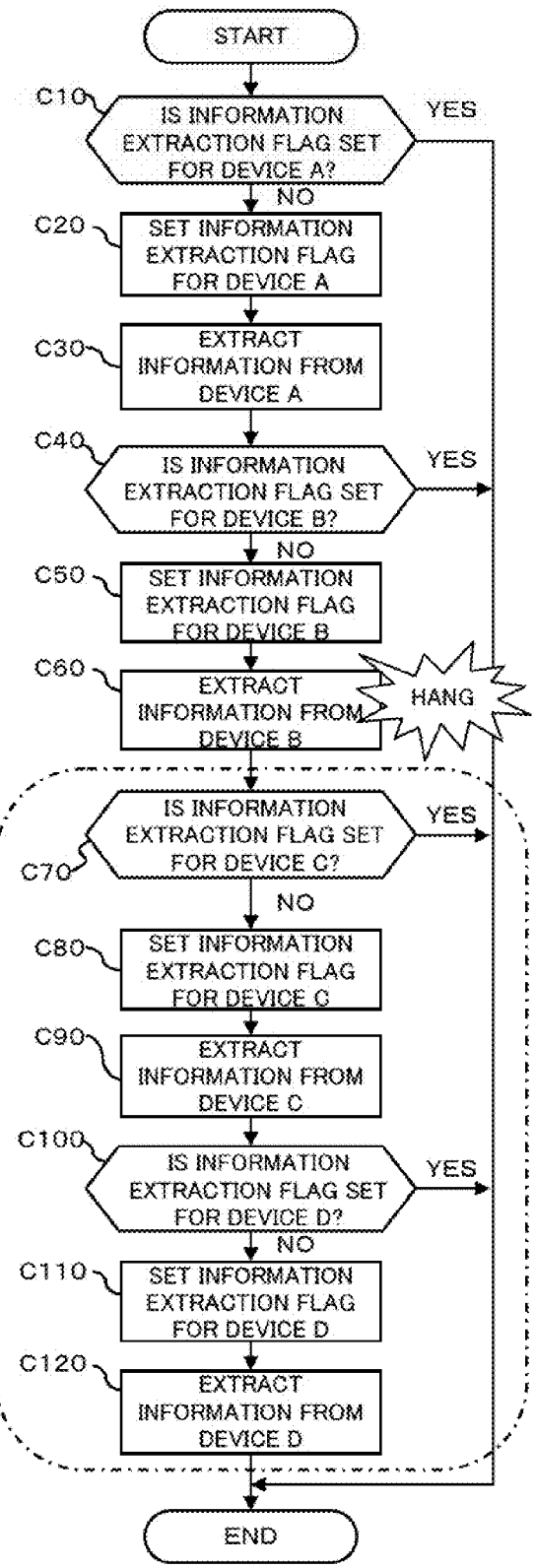
FIGS. 4a and 4b are flow diagrams each denoting a succession of procedural steps to extract information in the information processor of the first modification.

In the extraction of information, the CPU 10a confirms the information extraction flag (extraction flag) for the device A (step C10), as denoted in FIG. 4(a). If the information extraction flag has been set for the device A (YES route in step C10), the CPU 10a judges that the CPU 10b has completed to extract information from all the devices 14, and terminates the procedure.

If the information extraction flag has not been set for the device A (NO route in step C10), the CPU 10a sets the information extraction flag for the device A (step C20) and then accesses the device A to extract information from the device A (step C30).

Next, the CPU 10a confirms the presence of the information extraction flag for the device B (step C40). If the information extraction flag has been set for the device B (YES route in step C40), the CPU 10a judges the completion of extraction of information from all the devices 14, and terminates the procedure.

If the information extraction flag has not been set for the device B (NO route in step C40), the CPU 10a sets the information extraction flag for the device B (step C50) and then accesses the device B to extract information from the device B (step C60).

Next, the CPU 10a confirms the presence of the information extraction flag for the device C (step C70). If the information extraction flag has been set for the device C (YES route in step C70), the CPU 10a judges the completion of extraction of information from all the devices 14, and terminates the procedure.

If the information extraction flag has not been set for the device C (NO route in step C70), the CPU 10a sets the information extraction flag for the device C (step C80) and then accesses the device C to extract information from the device C (step C90).

Next, the CPU 10a confirms the presence of the information extraction flag for the device D (step C100). If the information extraction flag is set for the device D (YES route in step C100), the CPU 10a judges the completion of extraction of information from all the devices 14, and terminates the procedure.

If the information extraction flag has not been set for the device D (NO route in step C100), the CPU 10a sets the information extraction flag for the device D (step C110), then accesses the device D to extract information from the device D (step C120) and terminates the procedure.

If the CPU 10a hangs up during performing the above procedure, the subsequent process is not carried out. For example, assuming that the CPU 10a hangs up during extraction of information from the device B in the flow diagram FIG. 4(a) (see step C60), the CPU 10a cannot perform the subsequent process (steps C70 to C120).

The dashed line in the flow diagram of FIG. 4(a) encloses the steps that the CPU 10a cannot be carried out due to the system hanging-up occurred during extracting information from the device B.

Figure 4B:
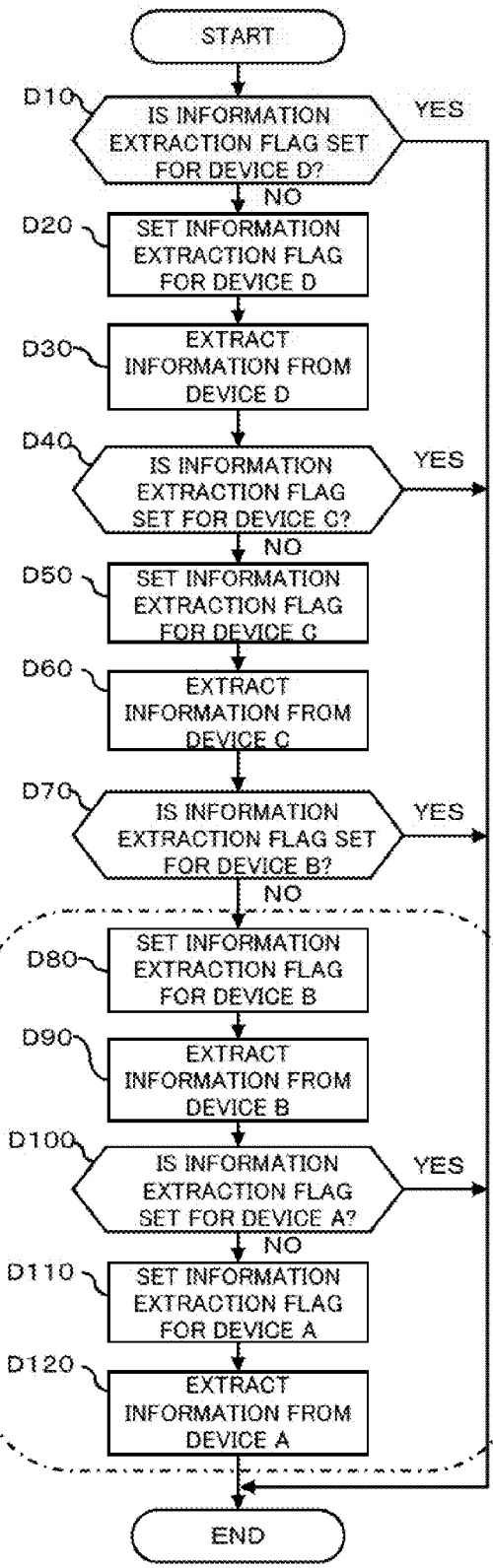
Figure 6:
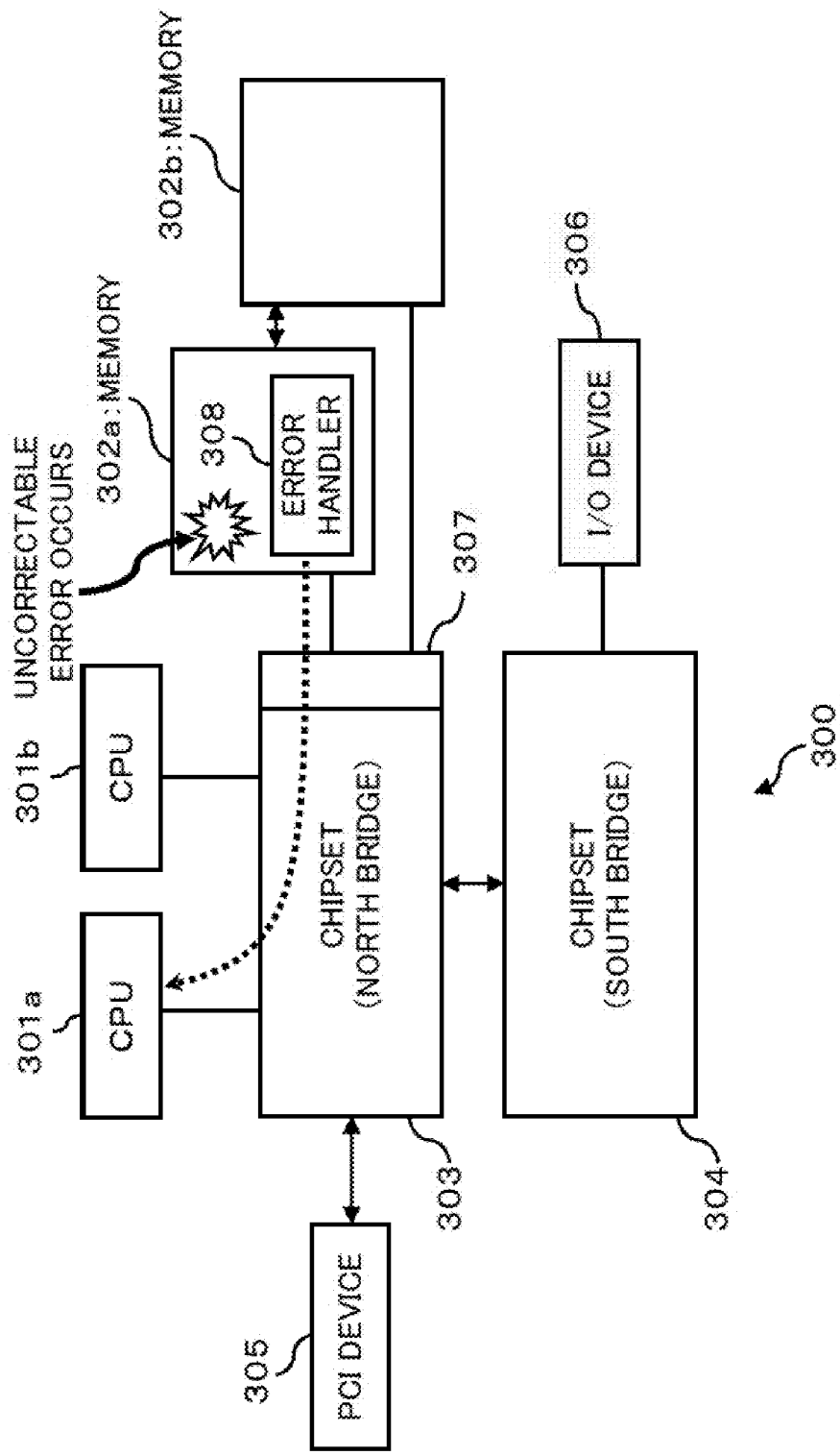
FIG. 6 is a block diagram schematically illustrating the hardware configuration of a conventional information processor.

In the meanwhile, the CPU 10b confirms the presence of the information extraction flag set for the device D (step D10) as denoted in FIG. 4(b) through the execution of the error handler 20b (error handler B) stored in the memory 16b. If the information extraction flag has been set for the device D (YES route in step D10), the CPU 10b judges that the CPU 10a has completed to extract information from all the devices 14, and terminates the procedure.

If the information extraction flag has not been set for the device D (NO route in step D10), the CPU 10a sets the information extraction flag for the device D (step D20) and then accesses the device D to extract information from the device D (step D30).

Next, the CPU 10b confirms the presence of the information extraction flag (extraction flag) for the device C (step D40). If the information extraction flag is set for the device C (YES route in step D40), the CPU 10b judges completion of extraction of information from all the devices 14, and terminates the procedure.

If the information extraction flag has not been set for the device C (NO route in step D40), the CPU 10b sets the information extraction flag for the device C (step D50) and then accesses the device C to extract information from the device C (step D60).

Next, the CPU 10b confirms the presence of the information extraction flag for the device B (step D70). If the information extraction flag is set for the device B (YES route in step D70), the CPU 10b judges the completion of extraction of information from all the devices 14, and terminates the procedure.

If the information extraction flag has not been set for the device B (NO route in step D70), the CPU 10b sets the information extraction flag for the device B (step D80) and then accesses the device B to extract information from the device B (step D90).

Next, the CPU 10b confirms the presence of the information extraction flag (extraction flag) for the device A (step D100). If the information extraction flag has been set for the device A (YES route in step D100), the CPU 10b judges the completion of extraction of information from all the devices 14, and terminates the procedure.

If the information extraction flag has not been set for the device A (NO route in step D100), the CPU 10b sets the information extraction flag for the device A (step D110), then accesses the device A to extract information from the device A (step D120), and terminates the procedure.

For example, if the system hangs up while the CPU 10a is extracting information from the device B (step C60) in the procedure of the flow diagram FIG. 4(a), the CPU 10a does not extract information from the subsequent devices C and D (i.e., the CPU 10a does not carry out steps C70 to C120). However, information of these non-extracted devices C and D is extracted by the CPU 10b through the execution of the error handler 20b.

The CPU 10b does not extract information from a device 14 (the device A in the example of FIGS. 4(a) and 4(b)) from which the CPU 10a has extracted information, so that the process can be efficiently performed.

In FIG. 4(b), the dashed line encloses steps that the CPU 10b does not carry out.

Further, since the CPU 10a has already set the information extraction flag from a device (a hanged-up device, the device B in the example of FIGS. 4(a) and 4(b)) from which the CPU 10a has been extracting information when a hang occurs, the CPU 10b does not make an access to the device B. That can prevent the CPU 10b from hanging up caused by an access to the device B as the CPU 10a has hanged up. Consequently, the information processor 100 of the first modification can escape from hanging up (freezing).

Even if an error occurs during the operation of the system in the information processor 100 of the first modification, the error handler 20 can extract information from each device 14 and the information processor 100 can avoid freezing. Thereby, the information processor 100 can rapidly handle errors and improve the reliability thereof.

For example, the CPU 10b does not extract information from a device (the device A in the example of FIGS. 4(a) and 4(b)) from which the CPU 10a has already extracted information, so that information can be efficiently extracted from the devices 14.

Further, if both CPUs 10a and 10b do not hang up and therefore completes to extract information from the entire device 14, it takes shorter time as compared to time that a single CPU 10 requires to extract information from all the devices 14. That also enhances the processing speed (throughput).

Here, the CPU 10b may access and extract information from a device 14 (the device B in the example of FIGS. 4(a) and 4(b)) from which the CPU 10a has been extracting information when the CPU 10a has hanged up. That can specify whether the hang of the CPU 10a (the error handler 20a) is caused by an error in the device 14 or in the CPU 10a.

FIG. 5 is a table depicting a manner of specifying the cause of a hang occurred during extracting information from a device 14 in the first modification.

Assuming that the CPU 10a hangs up during access to a device 14 for extracting information through the execution of the error handler 20a, FIG. 5 represents a manner of making a judgment based on the result of information extraction (retry) through the execution of the error handler 10b by the CPU 10b from the hanged device (suspicious device) 14.

Specifically, if the CPU 10b hangs up while extracting information from the suspicious device 14, that is, if the CPU 10b does not correctly complete to extract the information, the suspicious device 14 is judged to be the cause of the hang (device malfunction).

On the other hand, if the CPU 10b does not hang up while extracting information from the suspicious device 14, that is, if the CPU 10b correctly completes to extract the information, the CPU 10a (hanged processor) is the cause of the hang (CPU malfunction). Thereby, it is possible to easily specify (judge) the cause of the hang.

If the CPU 10a accessing a device 14 for extracting information hangs up while executing the error handler 20a, it is preferable that, before the CPU 10b retries to extract information from the suspicious device 14, error information including execution of the forthcoming retry and information to specify the suspicious device 14 (for which device 14, the CPU 10b is to retries to extract information) are stored in a non-volatile memory such as CompactFlash (trademark).

Thereby, even if the CPU 10b hangs up due to the retry so that both CPUs 10a and 10b hang up, the suspicious device 14 can be easily specified simply with reference to the stored error information, enhancing the convenience of the information processor 100.

(C) Others

The present invention should by no means be limited to the foregoing embodiment, and various changes and modifications may be suggested without departing from the gist of the present invention.

For example, the information processor 100 of the first embodiment is described on the assumption that an error (an uncorrectable error) occurs in the memory 16a. Specifically, the CPU 10a executes the error handler 20a and, if the CPU 10a cannot correctly operate the error handler 20a, the CPU 10b executes the error handler 20b stored in the memory 16b and extracts information from a device 14. However, the present invention is not limited to the above, and various changes and modifications can be suggested without departing from the sprit of the present invention.

For example, in the event of occurrence of an uncorrectable error in the memory 16b, the CPU 10b may execute the error handler 20b and, if the CPU 10b fails in the execution of the error handler 20b, the CPU 10a may execute the error handler 20a stored in the memory 16a and may thereby extract information from each device 14.

INDUSTRIAL APPLICABILITY

The present invention can be applied to an information processor including a number of processors and a number of memories in order to handle various errors occurred in the information processor.

The information processor disclosed herein ensures at least one of the following effects and advantages.

If an error occurs in a memory, error handling, such as specifying the point of occurrence of the error and the cause of the error, can be carried out under the circumstance where the memory with the error is temporarily disabled, so that the reliability of the system can be enhanced.

Since, even if an error occurs, error handlers can extract information from each device without hanging up the information terminal, the error can be handled rapidly and the reliability can be further improved.

Information can be extracted from the devices in a shorter time.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present inventions have been described in detail, it should be understood that the various changes, substitutions, and alterations could be made hereto without departing from the spirit and scope of the invention.

What is claimed is:

1. An information processing apparatus comprising:
a plurality of processors comprising a first processor and a second processor;
a plurality of memories comprising a first memory and a second memory; and
a plurality of devices,
at least two error handler program retaining sections which are provided at least to said first memory and said second memory and which retain an error handler program,
if an error occurs in one of said memories,
said first processor executing the error handler program stored in said first memory,
if said first processor has failed to normally complete the error handler program,
said second processor executing the error handler program stored in said second memory,
if a second error occurs at one of said devices,
said first processor sequentially accessing one or more non-extracted devices from which information has not been extracted among said devices in a first scanning order to extract information from each of the non-extracted devices, and the second processor sequentially accessing the non-extracted devices in a second scanning order reverse to the first scanning order to extract information from the non-extracted devices.

2. The information processing apparatus according to claim 1, wherein if one of said first processor and said second processor abnormally stops while extracting information from a first device of said devices,
the other processor accesses said first device to extract the information from said first device, and a cause of the abnormally stopping of the first processor is judged on the basis of a success or a failure in the extracting of the information by the second processor.

3. An information processor comprising:
a plurality of processors including a first processor and a second processor;
a memory; and
a plurality of devices,
if an error occurs while a process is being performed on one of the devices,
said first processor sequentially accessing one or more non-extracted devices from which information has not been extracted among said devices in a first scanning order to extract information from each of the non-extracted devices, and the second processor sequentially accessing the non-extracted devices in a second scanning order reverse to the first scanning order to extract information from the non-extracted devices.

4. The information processor according to claim 3, wherein if one of said first processor and said second processor abnormally stops while extracting information from a first device of said devices,
the other processor accesses said first device to extract the information from said first device, and a cause of the abnormally stopping of the first processor is judged on the basis of a success or a failure in the extracting of the information by the second processor.

* * * * *